(12) United States Patent
Fidan et al.

(10) Patent No.: US 10,968,545 B2
(45) Date of Patent: Apr. 6, 2021

(54) CAP PLY REINFORCEMENT CORD

(71) Applicant: KORDSA TEKNIK TEKSTIL ANONIM SIRKETI, Kocaeli (TR)

(72) Inventors: Saadettin Fidan, Kocaeli (TR); Kursat Aksoy, Kocaeli (TR); Neslihan Gulbeycan, Kocaeli (TR)

(73) Assignee: KORDSA TEKNIK TEKSTIL ANONIM SIRKETI, Kocaeli (TR)

( * ) Notice: Subject to any disclaimer, the term of this patent is extended or adjusted under 35 U.S.C. 154(b) by 468 days.

(21) Appl. No.: 15/739,781

(22) PCT Filed: Sep. 7, 2016

(86) PCT No.: PCT/TR2016/050336
§ 371 (c)(1),
(2) Date: Dec. 26, 2017

(87) PCT Pub. No.: WO2017/048207
PCT Pub. Date: Mar. 23, 2017

(65) Prior Publication Data
US 2018/0186185 A1    Jul. 5, 2018

(30) Foreign Application Priority Data
Sep. 17, 2015  (TR) ................. 2015/11621

(51) Int. Cl.
*D02G 3/48*    (2006.01)
*B60C 9/00*    (2006.01)
*D01F 6/60*    (2006.01)
*D01F 6/90*    (2006.01)
*B60C 9/22*    (2006.01)
(Continued)

(52) U.S. Cl.
CPC ............. *D02G 3/48* (2013.01); *B60C 1/0016* (2013.01); *B60C 9/005* (2013.01); *B60C 9/0042* (2013.01); *B60C 9/22* (2013.01); *D01F 6/60* (2013.01); *D01F 6/90* (2013.01); *D02G 3/045* (2013.01); *D02G 3/28* (2013.01);
(Continued)

(58) Field of Classification Search
CPC ..... B60C 1/0016; B60C 9/0042; B60C 9/005; B60C 9/22; D02G 3/28; D02G 3/48
See application file for complete search history.

(56) References Cited

U.S. PATENT DOCUMENTS 3,160,193 A * 12/1964 Baggett .................... D02G 3/48
152/556
3,614,864 A   10/1971 Berthold et al.
(Continued)

FOREIGN PATENT DOCUMENTS

EP    0329593 A1    8/1989
EP    2065222 A1    6/2009

*Primary Examiner* — Shaun R Hurley
(74) *Attorney, Agent, or Firm* — Bayramoglu Law Offices LLC

(57) ABSTRACT

The present invention relates to a asymmetric cap ply reinforcement cord comprising yarns having yarns with two different linear density values in range of 1300-1500 dtex and 850-100 dtex in the cap ply reinforcement layer that is located between the tread and the belt package in a pneumatic radial vehicle tire comprising a tread and a belt package, and that is formed by winding spirally as strip comprising at least two cords such that it will make 0 to 5° angle with the equatorial plane on the said belt package.

11 Claims, 4 Drawing Sheets

(51) Int. Cl.
    *B60C 1/00*     (2006.01)
    *D02G 3/04*     (2006.01)
    *D02G 3/28*     (2006.01)

(52) U.S. Cl.
    CPC ............... *B60C 2009/2214* (2013.01); *B60C 2009/2257* (2013.01); *B60C 2009/2285* (2013.01); *D10B 2331/02* (2013.01)

(56) References Cited

U.S. PATENT DOCUMENTS

| | | | | |
|---|---|---|---|---|
| 4,155,394 A * | 5/1979 | Shepherd | ............. | B60C 9/0042 139/426 R |
| 4,323,612 A * | 4/1982 | van Issum | ............. | D03D 27/00 428/89 |
| 4,720,943 A * | 1/1988 | Arrant | ............. | D02G 3/48 57/210 |
| 4,877,073 A * | 10/1989 | Thise | ............. | B60C 9/0042 152/451 |
| 6,601,378 B1 * | 8/2003 | Fritsch | ............. | D02G 3/28 57/237 |
| 10,208,407 B2 * | 2/2019 | Fidan | ............. | D02G 3/48 |
| 2002/0142160 A1 * | 10/2002 | Gazit | ............. | D02G 3/346 428/373 |
| 2002/0166316 A1 * | 11/2002 | Mills | ............. | D02G 3/445 57/293 |
| 2003/0200739 A1 * | 10/2003 | Fernandez | ............. | D02G 3/285 57/58.36 |
| 2006/0213174 A1 * | 9/2006 | Wu | ............. | F16G 5/08 57/237 |
| 2011/0016840 A1 * | 1/2011 | Rittenhouse | ............. | D02G 3/285 57/76 |
| 2013/0240105 A1 | 9/2013 | Zmolek et al. | | |
| 2015/0328928 A1 * | 11/2015 | Justine | ............. | D02G 3/48 152/451 |

* cited by examiner (1a)　　　　　　　(1b)　　　　　　　(1c)

(3b)

(3a)

(3c)

(4a)

(4b)

(4c)

(4d)

(4e)

CAP PLY REINFORCEMENT CORD

CROSS REFERENCE TO RELATED APPLICATIONS

This application is the national phase entry of International Application No. PCT/TR2016/050336, filed on Sep. 7, 2016, which claims priority from the Turkish patent application no. 2015/11621 filed on Sep. 17, 2015, the entire contents of which are incorporated herein by reference.

TECHNICAL FIELD OF THE INVENTION

The present invention relates to a cap ply reinforcement cord which forms the cap ply reinforcement layer located between the tread and the belt package in vehicle tires used in motor vehicles, and which enhances the high speed performance of the tire.

BACKGROUND OF THE INVENTION

In belt packages present in radial passenger vehicle tires used today, there is at least two cross belt layers, and a textile cap ply reinforcement layer wrapped spirally in circumferential direction on the belt. The cross belt layers comprising steel cords provide the lateral and circumferential rigidity required for the tire performance. The function of the cap ply layer is to decrease the tire growth in tire diameter caused by the centrifugal force occurring at high speed, and decrease the pantographic movements between the belt layers beside the said growth, thereby avoiding belt edge separations and improving tire performance.

It is the radial pressure (restraining force) applied by the cap ply layer on the belt package under dynamic conditions which enables it to improve the tire performance. The two important features enabling the said force to be effective is the modulus and thermal shrink force of the textile cords at service temperature. Nylon 6.6, polyester (PET) and aramid/nylon hybrid cords can be given as examples for reinforcement types used in current cap ply layer applications. In nylon 6.6 reinforcing cord application, the cord manufactured from nylon 6.6 is wrapped on the steel belt package as single or double layer in yarn and cord constructions such as 940×1, 1400×1, 940×2, 1400×2, 1880×2 and 2100×1 according to speed class of the tire such that it will make 0-5° angle between the equatorial plane and it will cover the whole belt width as single cord or strip comprised of a plurality of parallel cords. When nylon 6.6 is used, cord modulus decreases at increased temperature at high speeds, while the thermal shrink force increases, and thus it can compensate the difference due to the decrease in modulus. Furthermore, the nylon 6.6 having high fatigue resistance and excellent adhesion with the rubber material enables this polymer to be commonly preferred as cap ply reinforcement layer.

In high speed tires, when nylon 6.6 is used in symmetrical 940×2 constructions, the cord density (epdm, number of cords in 10 cm) is increased in order not to increase the number of layers above two. This density is increased up to 160 epdm in several cases. In this case, the rivet area is decreased, and thus rubber penetration between the cords becomes difficult.

As another option, when the said nylon 6.6 is used in symmetrical 1400×2 construction in high speed tires, the total layer thickness increases depending on the cord thickness, and the increase in thickness causes the tire weight to increase. At the same time, the rolling resistance of the tire increases depending on the increased rubber amount. The increased tire weight and the increased rolling resistance cause more fuel consumption.

Polyester, which is one of the reinforcement types used in current cap ply layer applications, can be used for forming cap ply reinforcing layer especially in different constructions due to its high modulus. Especially, polyethylene terephthalate (PET) may be preferred in different constructions due to its high modulus. However, the modulus of the PET drops significantly at high temperature, while the adhesion of the cord on the rubber decreases due to thermal degradation. Furthermore, the bending and fatigue resistance under compression of the PET is much weaker relative to the nylon 6.6.

Another cap ply reinforcement used in the current technique, hybrid cords, are used in high speed tires since they can be used as single layer, the rivet area can be maintained wide, and the total amount of rubber in the cap ply reinforcing layer can be decreased. Besides, it can easily be processed since it has low initial modulus, and it also improves the high speed performance of the tire since it has high modulus after process. However, aramid/nylon hybrid cords are more expensive than the nylon 6.6 and polyester yarns.

The advantages and disadvantages of the cap ply reinforcement applications used in the current technique are explained above. In these applications, nylon 6.6 asymmetrical cord constructions that will decrease fuel consumption and increase the high speed resistance of the tire by enabling the use of less rubber in the tire are not disclosed. In other words, a nylon 6.6 cord construction that will cover the gap between the 1400×2 and 940×2 symmetrical cord constructions and between the linear density values corresponding to this construction range is not disclosed.

SUMMARY OF THE INVENTION

An objective of the present invention is to provide a reinforcement cord with the use of asymmetrical cord having a linear density present between the linear density values created by symmetrical cord constructions that are currently being used in the present technique.

Another objective of the present invention is to provide a cap ply reinforcement cord wherein the disadvantages experienced in cords in 1400×2 and 940×2 construction are eliminated with the use of 1400 dtex and 940 dtex yarns used in 1400×2 and 940×2 symmetrical cord constructions in the current technique being used in combination and thereby forming asymmetrical cord in 1400+940 construction.

A further objective of the present invention is to provide a cap ply reinforcement cord which decreases the fuel consumption of the tire with the use of rubber within the predetermined limits.

Yet another objective of the present invention is to provide a cap ply reinforcement cord which enables rubber penetration between cords without decreasing the rivet area, and which increases the tire durability.

Another objective of the present invention is to provide a cap ply reinforcement cord which is wrapped between the tread and belt package of the tires and which has optimal features especially for the radial passenger car tires.

DETAILED DESCRIPTION OF THE INVENTION

A cap ply reinforcement cord developed to fulfill the objectives of the present invention is illustrated in the accompanying figures, in which.

Figure 4:
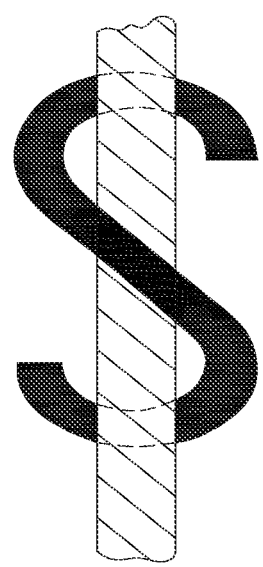
Figure 4:
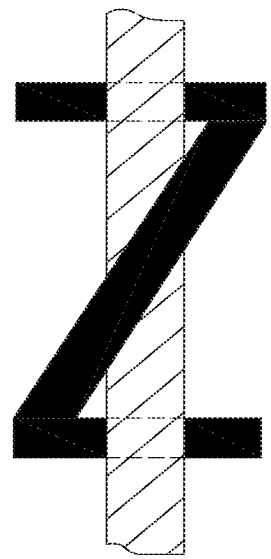
Figure 4:
Figure 4:
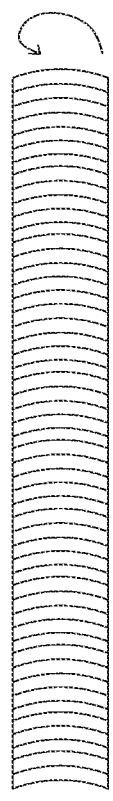
Figure 4:
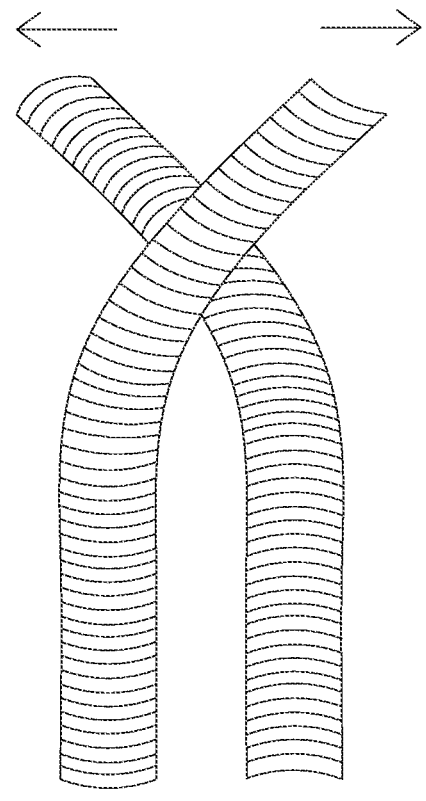
Figure 4:

FIG. 4 is the view of the pre-twisting directions of the yarns (4a. S twist direction cord, 4b. Z twist direction cord, 4c. yarn in S twist direction of FIG. 4a and yarn in Z twist direction of FIG. 4b, 4d. yarns of FIG. 4c twisting together, and 4e. yarns of FIG. 4d twisted together to form the cords of figures of 1a-1c)

You can find the definitions of several terms used in the description while disclosing the invention.

The cap ply reinforcement layer is a reinforcing layer provided between the top layer of the belt package and the tread. In this invention, the effects of the reinforcements used in the cap ply reinforcement layer on the tire performance are optimized.

"Polyester (P)" is a class of polymers. Polyethylene terephthalate (PET) is the most commonly used polyester type used in tire industry, and it is preferred due to its high modulus.

"Polyamide" is also known as nylon, and it refers to the most commonly used nylon fiber. The most commonly known and used three main molecule compositions are nylon 6, nylon 6.6, and nylon 4.6.

"Dtex" is a thickness measurement unit used for synthetic based yarns, in other words it is the unit of the linear density. It refers to the weight of a yarn in length of 10.000 as gram.

"Tire tread" refers to the part of the tire contacting the road.

"Tire belt" is located on the carcass circumferentially as at least two layers below the tire tread, it is comprised of steel cords parallel to each other and it forms a rigid circle package by making acute angle with the equatorial plane. "Equatorial plane" is the plane vertical to the rotational axis of the tire and passing through the center of the tire tread.

"Twist" is the name given for turning the yarn around its own axis. The twist level is expressed with the number of turns per meter, and it is shown as "tpm".

"Pre-twist" is the twist given to the yarns forming the cord, and it is in opposite direction of the cord twisting direction.

Cord twist is twisting the yarns pre-twisted in same direction in opposite direction by combining them.

The inventive cap ply reinforcement cord (1) and the cap ply reinforcement layer formed therewith is located between the tread and the belt package in pneumatic radial vehicle tire, and it is wrapped around the belt package in strips comprised of single cord or a plurality of cords parallel to each other such that it will make 0 to 5° angle with the equatorial plane. The said cord construction is asymmetrical, and it comprises yarns having two different linear density values.

In a preferred embodiment of the invention, when the linear density of one of the yarns is in range of 1300-1500 dtex, and the linear density value of another yarn is in range or 850-1000 dtex; the linear density value of the cord obtained by winding the yarns in these densities is in range of 2150-2500 dtex.

In a preferred embodiment of the invention, when the linear density of one of the yarns is in range of 1300-1500 dtex, and the linear density value of another yarn is in range or 850-1000 dtex; an example of the cord construction obtained by cabling the 1400 dex and 940 dtex yarns together is 1400 dtex+940 dtex.

In a preferred embodiment of the invention, the yarns forming the asymmetrical cord are manufactured from aliphatic polyamide polymers.

In another preferred embodiment of the invention, the cord obtained by cabling the aliphatic polyamide yarn having linear density of 1400 dtex and aliphatic polyamide yarn having linear density of 940 dtex together has the construction of 1400+940.

The preferred embodiment of the invention is a reinforcement cord obtained with the cord provided by cabling the aliphatic polyamide yarn having linear density of 1400 dtex and aliphatic polyamide yarn having linear density of 940 dtex together has the construction of 1400+940.

The cap ply reinforcement layer formed by the inventive asymmetrical cord is formed of wrapping more than one continuous strip next to each other spirally on the belt package.

The asymmetrical cord forming the inventive cap ply reinforcement layer is obtained from yarn manufactured from polyamide. In a preferred embodiment of the invention, nylon 6.6 is used due to its bielastic and high melting temperature features. The optimal performance values desired in high speed tires can easily be obtained when nylon 6.6 cap ply reinforcement cord is used.

In different embodiments of the invention, the yarns forming the cord can be obtained from nylon 6.6 or nylon 6 polymers. All of the yarns forming the cord can be nylon 6.6 or nylon 6. One of the yarns forming the cord can be nylon 6.6 while the other one can be nylon 6. In another embodiment, at least one yarn used in forming asymmetrical cord is comprised of nylon 6.6 and nylon 6 polymer blends. At least 90% of the nylon 6.6 or nylon 6 yarns forming the inventive asymmetrical cord by weight are comprised of aliphatic polyamide polymer material preferred for this yarn.

Figure 1:
FIG. 1 is the view of the cords in different constructions (1a. 1400+940 dtex, 1b. 1400×2 dtex, 1c. 940×2 dtex)
Figure 1:
Figure 1:
Figure 2:
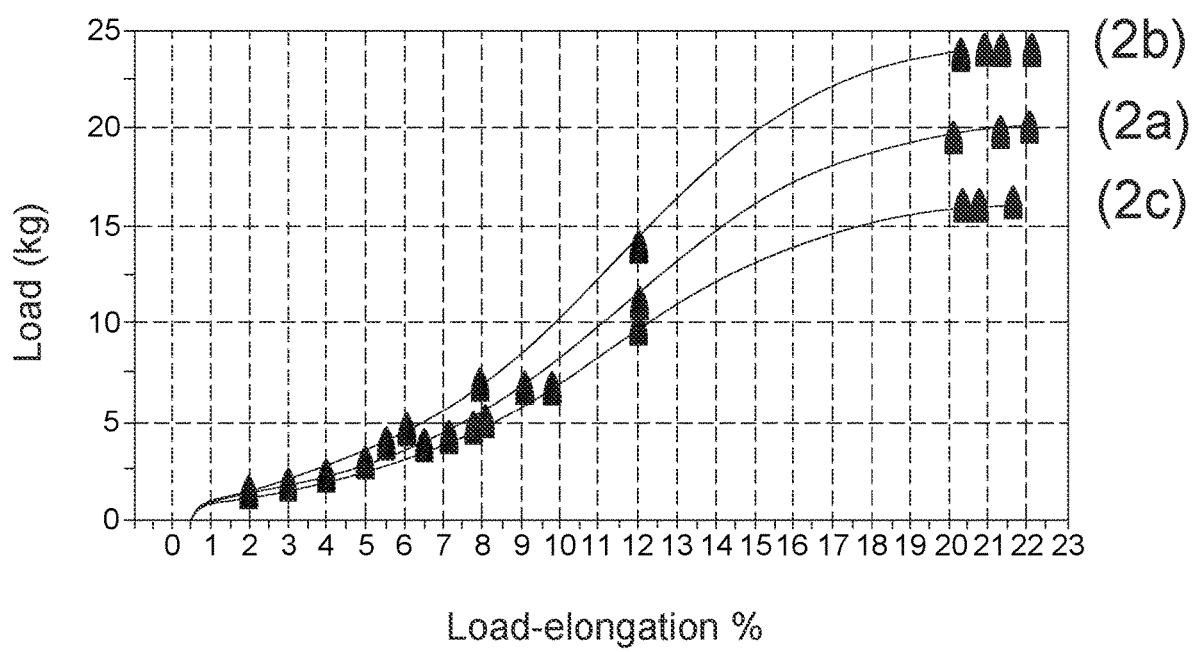
FIG. 2 is the view of the load-elongation behaviors of the cords in different constructions on table (2a. 1400+940 dtex, 2b. 1400×2 dtex, 2c. 940×2 dtex).
Figure 3:
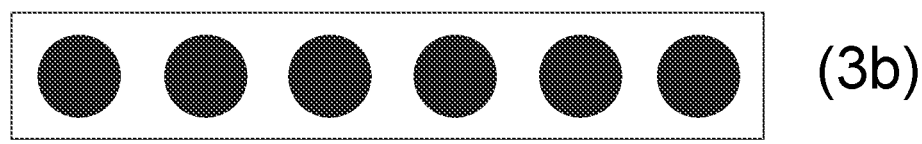
FIG. 3 is the view of the thickness of the cords and the intervals between the cords in different constructions (3a. 1400+940 dtex, 3b. 1400×2 dtex, 3c. 940×2 dtex)
Figure 3:
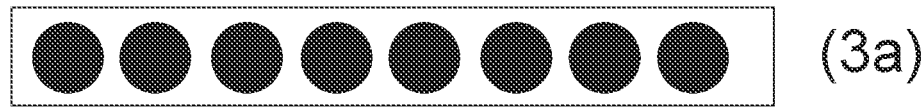
Figure 3:
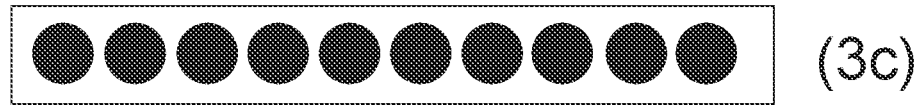

In the said invention, using cord obtained in asymmetrical construction by cabling the yarn in two different linear density in cap ply reinforcements enables to eliminate disadvantages experienced in cap ply reinforcements wherein symmetrical two-ply cords formed by the yarns having same linear densities are used. For example, since cord thickness is high in 1400×2 constructions in cap ply reinforcements, a large amount of rubber is used on the cap ply, this causes the rolling resistance and thus the fuel consumption of the tire to increase. Since higher cord density is required use of cords with 940×2 constructions, the rivet area decreases, and this prevents the rubber penetration between the cords and decrease the resistance of the tire. The production of a cord having a linear density between the linear density values provided by the said two constructions does not exist in the state of the art. The said invention provides solution for these problems experienced in the state of the art by obtaining asymmetrical cord in construction of 1400 dtex+940 dtex and in nominal linear of density of 2340 dtex by means of twisting two yarns having linear densities 1400 dtex and 940 dtex together. The fatigue resistance of the tire under dynamic conditions is increased in use of 1400 dtex+940 dtex construction. Load-elongation behaviors of the cords in 1400×2, 1400+940, and 940×2 are shown in FIG. 2.

The inventive cap ply reinforcement cord the total nominal cord linear density of which is 2340 dtex (1400 dtex+940 dtex) fills the gap between the 1400×2 and 940×2 cord linear densities the total nominal thickness values of which is 2800 dtex and 1880 dtex and which is used commonly. The inventive cap ply reinforcement cord has asymmetrical structure, and it does not cause and tenacity loss.

As shown in FIG. 4, the cord is obtained by twisting two or more yarns pre-twisted in same direction in opposite direction by combining them. The twist directions of the yarns are expressed with letters S and Z. When the yarn is twisted in S direction; the twisting incline of the yarn shows parallelism with the middle part of letter S when the yarn is held vertically. When the yarn is twisted in Z direction, the yarn twist direction shows parallelism towards the middle part of letter Z. The pre-twisting directions of the yarns forming the asymmetrical cord are same (Z or S), and they are equal to the cord twist level in the opposite direction (Z or S). In one embodiment of the invention, the pre-twist levels of polyamide yarns in Z or S direction are equal to the twist level of the cord which they form in S or Z direction. The twist level is expressed with the number of twist/turns per meter, and it is shown as "tpm".

Layered twisted cord is obtained by twisting the pre-twisted yarns together. Cap ply reinforcement layer is obtained by using the layered asymmetrical cord obtained by these two pre-twisted yarns having different linear densities and twisted together on the belt.

The twist level of the asymmetrical cap ply reinforcement cord can vary between 150 tpm and 400 tpm. The modulus (elongation resistance) of the cord in twist levels higher than 400 tpm is low, and it cannot provide the sufficient resistance against the centrifugal force on the belt package. In twist levels under 150 tpm, the fatigue resistance of the cord is not in sufficient level, and it causes cord ruptures under dynamic conditions. In a preferred embodiment of the invention, the cap ply reinforcement cord is in asymmetrical cord structure and it prevents the above mentioned disadvantages.

In the preferred embodiment of the invention, the difference between the twist levels of the polyamide yarn having linear density of 1300-1500 dtex levels and the polyamide yarn having linear density in range of 850-1000 dtex in the asymmetrical cord is maximum 20%. The twist levels of the yarn forming the cord being in a value over this difference causes the elongation resistance of the cord to decrease. At the same time, this difference being more than 20% causes the twist asymmetry in cords to increase and a growth to occur in cord diameter, thereby increasing the rolling resistance since it requires to use more rubber.

In a preferred embodiment of the invention, the difference between the twist level of the yarns themselves in the asymmetrical cord, and between these yarns and the cord is maximum 20%.

What is claimed is:

1. A cap ply reinforcement layer provided in a pneumatic radial vehicle tire, the cap ply reinforcement layer is located between a tread and a belt package of the pneumatic radial vehicle tire, wherein the cap ply reinforcement layer is formed by winding spirally as a strip, wherein the strip makes an angle with an equatorial plane on the belt package, and the strip comprises at least two cap ply reinforcement cords, wherein each cap ply reinforcement cord is formed by twisting a first aliphatic polyamide yarn and a second aliphatic polyamide yarn together, wherein the first aliphatic polyamide yarn has a linear density of 1400 dtex, and the second aliphatic polyamide yarn has a linear density of 940 dtex.

2. The cap ply reinforcement layer according to claim 1, wherein the first aliphatic polyamide yarn and the second aliphatic polyamide yarn are nylon 6.6 yarns.

3. The cap ply reinforcement layer according to claim 2, wherein a ratio of the nylon 6.6 polymer in the nylon 6.6 of the first and second aliphatic polyamide yarns comprised by the cap ply reinforcement cord is at least 90% by weight.

4. The cap ply reinforcement layer according to claim 1, wherein the first aliphatic polyamide yarn and the second aliphatic polyamide yarn are nylon 6 yarns.

5. The cap ply reinforcement layer according to claim 4, wherein a ratio of the nylon 6 polymer in the nylon 6 of the first and second aliphatic polyamide yarns comprised by the cap ply reinforcement cord is at least 90% by weight.

6. The cap ply reinforcement layer according to claim 1, wherein the first aliphatic polyamide yarn is nylon 6.6 yarn and the second aliphatic polyamide yarn is nylon 6 yarn.

7. The cap ply reinforcement layer according to claim 1, wherein the first aliphatic polyamide yarn and the second aliphatic polyamide yarn are obtained by composition of nylon 6.6 and nylon 6 polymers.

8. The cap ply reinforcement layer according to claim 1, wherein a twist level of the cap ply reinforcement cord is in a range of 150-400 tpm to provide sufficient fatigue resistance of the cap ply reinforcement cord to prevent cord ruptures under dynamic conditions.

9. The cap ply reinforcement laver according to claim 1, wherein pre-twist levels of the first aliphatic polyamide yarns in a Z or S direction and the second aliphatic polyamide yarn in the opposing S or Z direction are equal to a twist level of the first aliphatic polyamide yarn in an S or Z direction and the second aliphatic polyamide yarn in the opposing S or Z direction that forms the cap ply reinforcement cord.

10. The cap ply reinforcement layer according to claim 1, wherein a difference between the first and second aliphatic polyamide yarn pre-twisting level and a cord twisting level is at most 20%.

11. The cap ply reinforcement laver according to claim 1, wherein a difference between a pre-twisting levels of the first aliphatic polyamide yarn and the second aliphatic polyamide yarn is at most 20%.

* * * * *